United States Patent
Oner et al.

(10) Patent No.: US 11,916,426 B2
(45) Date of Patent: Feb. 27, 2024

(54) INTEGRATED BATTERY CHARGE REGULATION CIRCUIT BASED ON POWER FET CONDUCTIVITY MODULATION

(71) Applicant: TEXAS INSTRUMENTS INCORPORATED, Dallas, TX (US)

(72) Inventors: Hakan Oner, San Jose, CA (US); Kevin Scoones, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 118 days.

(21) Appl. No.: 17/114,081

(22) Filed: Dec. 7, 2020

(65) Prior Publication Data
US 2022/0181898 A1 Jun. 9, 2022

(51) Int. Cl.
H02H 3/06 (2006.01)
H02J 7/00 (2006.01)

(52) U.S. Cl.
CPC ....... *H02J 7/007182* (2020.01); *H02H 3/066* (2013.01); *H02J 7/00714* (2020.01); *H02J 2207/30* (2020.01)

(58) Field of Classification Search
CPC ............ H02J 7/007182; H02J 7/00714; H02J 2207/30; H02H 3/066
See application file for complete search history.

(56) References Cited

U.S. PATENT DOCUMENTS

| | | | |
|---|---|---|---|
| 7,525,291 B1 * | 4/2009 | Ferguson | H02J 7/007182 320/128 |
| 2008/0123378 A1 * | 5/2008 | Chiang | H02M 1/32 363/80 |
| 2008/0252252 A1 * | 10/2008 | Wong | H01M 10/44 320/108 |
| 2013/0106449 A1 * | 5/2013 | Kikuchi | H01M 10/48 324/713 |
| 2019/0280346 A1 * | 9/2019 | Liao | H02J 9/062 |

OTHER PUBLICATIONS

Jones "USB Type-C™ and USB Power Delivery—no assembly required". Oct. 4, 2018, https://e2e.ti.com/blogs_/b/powerhouse/posts/usb-type-c-and-usb-power-delivery-no-assembly-required (Year: 2018).*
Gregoire, B. Robert. "A Compact Switched-Capacitor Regulated Charge Pump Power Supply." IEEE Journal of Solid-State Circuits, vol. 41, No. 8, Aug. 2006, pp. 1944-1953.

* cited by examiner

*Primary Examiner* — Drew A Dunn
*Assistant Examiner* — Pamela J Jeppson
(74) *Attorney, Agent, or Firm* — Michelle F. Murray; Frank D. Cimino

(57) ABSTRACT

A system includes: a switching converter circuit adapted to be coupled between an input voltage source and a load; and an integrated circuit adapted to be coupled between the input voltage source and a battery and configured to charge the battery. The integrated circuit has: a monitoring circuitry adapted to be coupled to the battery and configured to detect a transient fault condition of the integrated circuit; a power stage adapted to be coupled between the input voltage source and the battery, the power stage having a power switch; and a control circuit coupled between the monitoring circuitry and the power stage, the control circuit configured to provide a control signal to adjust a conductivity of the power switch responsive to a detected transient fault condition.

18 Claims, 8 Drawing Sheets

US 11,916,426 B2

INTEGRATED BATTERY CHARGE REGULATION CIRCUIT BASED ON POWER FET CONDUCTIVITY MODULATION

BACKGROUND

The proliferation of consumer electronic devices and integrated circuit (IC) technology has resulted in the commercialization of IC products. As new consumer electronic devices are developed and IC technology advances, new IC products are commercialized. One example IC product in consumer electronic devices is a switching converter circuit and/or a battery charger circuit.

One example battery charger circuit has external components, such as an overvoltage protection (OVP) field-effect transistor (FET). Such external components are bulky and costly. Also, integrated circuitry drives and regulates external components such as an OVP FET. Also, such external components affect the regulation loop performance and the regulation range of the battery charger circuit.

SUMMARY

In accordance with at least one example, a system comprises a switching converter circuit adapted to be coupled between an input voltage source and a load; and an integrated circuit adapted to be coupled between the input voltage source and a battery and configured to charge the battery. The integrated circuit has: a monitoring circuitry adapted to be coupled to the battery and configured to detect a transient fault condition of the integrated circuit; a power stage adapted to be coupled between the input voltage source and the battery, the power stage having a power switch; and a control circuit coupled between the monitoring circuitry and the power stage, the control circuit configured to provide a control signal to adjust a conductivity of the power switch responsive to a detected transient fault condition.

In accordance with another example, an integrated circuit comprises: an adaptor supply terminal; a battery terminal; monitoring circuitry coupled to the battery terminal and configured to detect a transient fault condition of a battery charge operation of the integrated circuit; a power stage coupled between an input voltage terminal and the battery terminal, the power stage having a power switch; and a control circuit coupled between the monitoring circuitry and the power stage, the control circuit configured to provide a control signal to adjust a conductivity of the power switch responsive to a detected transient fault condition.

In accordance with another example, a battery charger integrated circuit comprises: a first battery terminal; a second battery terminal; a control circuit having a first input and a second input; a voltage sense circuit having first voltage sense input, a second voltage sense input, and a voltage sense output, the first voltage sense input coupled to the positive battery terminal, the second voltage sense input coupled to the negative battery terminal, and the voltage sense output coupled to the first input of the control circuit; a current sense circuit having a first current sense input, a second current sense input, and a current sense output, the first current sense input coupled to a first side of a sense resistor in series with the positive battery terminal and the negative battery terminal, the second current sense input coupled to a second side of the sense resistor, and the current sense output coupled to the second input of the control circuit; and a power stage with a power switch and a gate driver circuit for the power switch, the gate driver circuit coupled to an output of the control circuit.

DETAILED DESCRIPTION

Described herein are integrated circuits (ICs) with battery charger circuitry and related systems. In operation, the ICs with battery charger circuitry are configured to detection an overcurrent or overvoltage condition. In response to the overcurrent or overvoltage condition, the battery charger circuitry decreases the conductivity of at least one power switch or transistor of an integrated (e.g., on-chip) power stage to reduce the amount of charge provided to a battery. In different examples, the topology of the integrated power stage varies.

In some examples, a system includes an input voltage source and a switching converter circuit between the input voltage source and a load. The system also includes a battery selectively coupled to the load. The system also includes an IC with battery charger circuitry (e.g., an inductorless converter circuit) coupled between the input voltage source and the battery, where the battery charger circuitry is configured to charge the battery. The battery charger circuitry includes a monitoring circuit coupled to the battery and a power stage coupled between the input voltage source and the battery. The power stage includes a power switch and a control circuit that is coupled between the monitoring circuit and the power stage. The control circuit is configured to adjust a conductivity of the power switch in response to a transient fault condition of the battery charger circuitry detected by the monitoring circuit.

With the ICs having battery charger circuitry, bulky and costly external (e.g., off-chip) components such as overvoltage protection (OVP) field-effect transistors (FETs) are eliminated. Also, integrated circuitry to drive and regulate external components, such as OVP FETs, are eliminated. Further, the effect of off-chip components, such as OVP FETs, to the regulation loop performance of the battery charger circuitry is eliminated. Moreover, regulation range limits due to off-chip components, such as OVP FETs, are eliminated. The expansion of the dynamic regulation range of ICs with battery charger circuitry is a valuable improvement.

Figure 1:
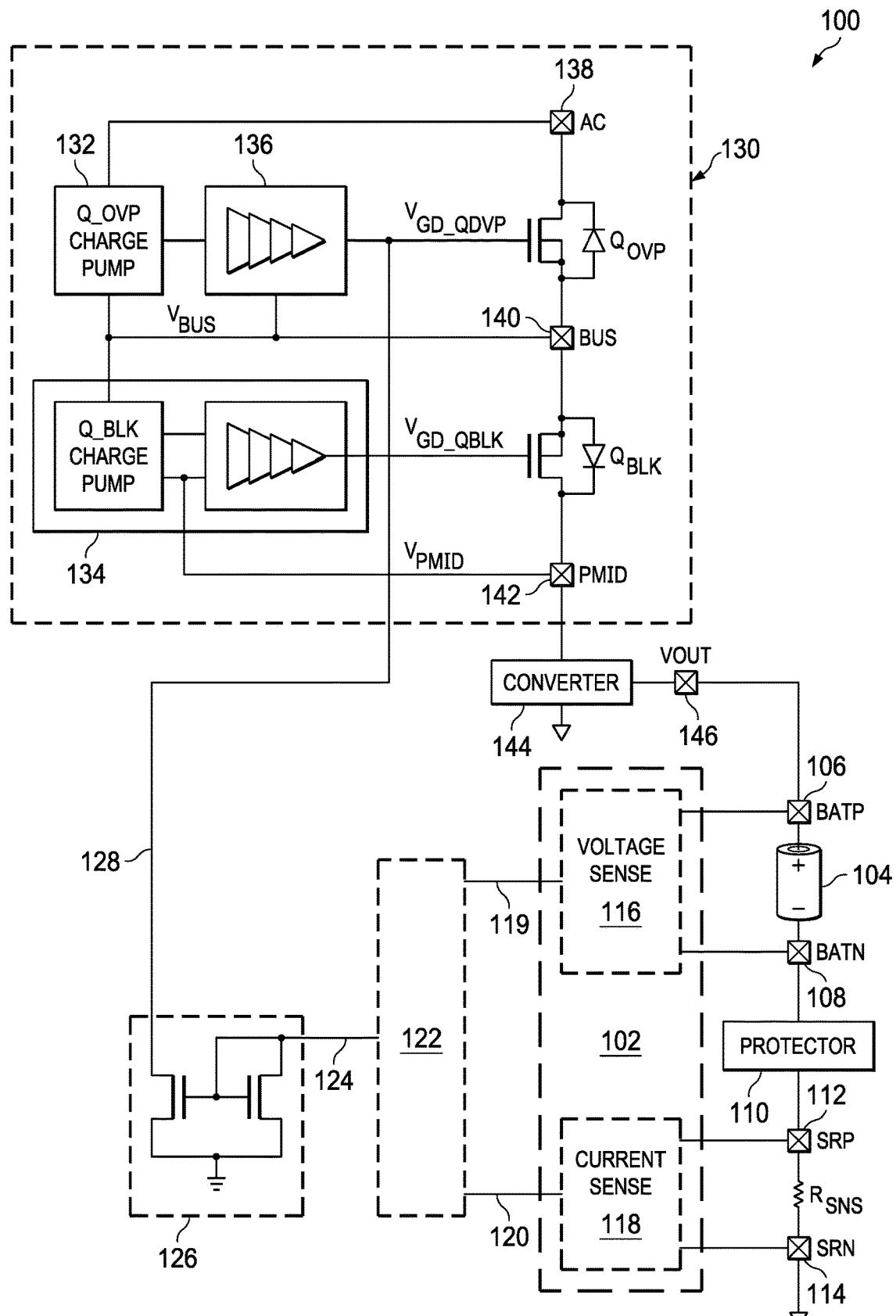
FIG. 1 is a diagram showing a system with a battery charger circuitry having external components in accordance with conventional circuitry.

FIG. 1 is a diagram showing a system 100 with battery charger circuitry having external components in accordance with conventional circuitry. As shown, the system 100 includes a monitoring circuit 102 with a voltage sense circuit 116 configured to provide a battery voltage sense signal 119. The monitoring circuit 102 also includes a current sense circuit 118 configured to provide a battery current sense signal 120. In the example of FIG. 1, the monitoring circuit 102 is coupled to a positive battery terminal (BATP) pin 106 and a negative battery terminal (BATN) pin 108, where a battery is coupled between the BATP pin 106 and the BATN pin 108. The monitoring circuit 102 is also coupled to positive sense resistor (SRP) pin 112 and a negative sense resistor (SRN) pin 114 coupled to opposite ends of a sense resistor ($R_{SNS}$). In some examples, a protector circuit 110 is between the negative battery terminal pin 108 and the SRP pin 112 as shown in FIG. 1. In other examples, both the protector circuit 110 and $R_{SNS}$ reside at the high side or BATP side of the battery 104.

As shown, the battery voltage sense signal 119 and the battery current sense signal 120 are provided to a control circuit 122 configured to provide a control signal 124 based on the value of the battery voltage sense signal 119 and/or the value of the battery current sense signal 120. The control signal 124 is provided to a current mirror circuit 126, resulting in a mirrored signal 128 corresponding to a sink current for a regulation circuit 130. In the example of FIG. 1, the regulation circuit 130 includes a first charge pump 132 configured to provide a gate drive signal ($V_{GD\_QOVP}$) to an external transistor ($Q_{OVP}$) used as an OVP FET for a converter circuit 144 used as a battery charger. In the example of FIG. 1, the current terminals of $Q_{OVP}$ are coupled between an alternative current (AC) terminal 138 and a bus terminal 140, and the control terminal of $Q_{OVP}$ is coupled to a buffer circuit 136 powered by a charge pump 132. The regulation circuit 130 also includes a charge pump and buffer circuit 134 configured to provide a gate drive signal ($V_{GD\_QBLK}$) to a transistor ($Q_{BLK}$) used to selectively enable or disable current flow to a PMID terminal 142, which corresponds to the terminal between the reverse block power FET ($Q_{BLK}$) and the converter circuit 144. As shown, the current terminal of $Q_{BLK}$ are coupled between the bus terminal 140 and the PMID terminal 142, and the control terminal of $Q_{BLK}$ is coupled to the charge pump and buffer circuit 134.

In FIG. 1, the input of the converter circuit 144 is coupled to the PMID terminal 142. The output of the converter circuit 144 is coupled to an output terminal 146 configured to provide an output voltage (VOUT), where VOUT is maintained by an output capacitor ($C_{OUT}$) and is used to charge the battery 104. In some examples, the monitoring circuit 102, the control circuit 122, the current mirror 126, and/or the converter circuit 144 are components of one IC. In such examples, part of the regulation circuit 130 may be part of the IC as well, where $Q_{OVP}$ is external to the IC.

In operation, the monitoring circuit 102, the control circuit 122, and the current mirror 126 adjust the mirrored signal 128, which affects the value of $V_{GD\_QOVP}$ provided by the regulation circuit 130 to the control terminal of $Q_{OVP}$. In this manner, the conductivity of $Q_{OVP}$ is adjusted as desired (e.g., to adjust the voltage at the PMID terminal 142 in response to an overvoltage or overcurrent condition). Such adjustments maintain VOUT within a desired target to safely charge the battery 104. Use of an external OVP FET (e.g., $Q_{OVP}$) in the system 100 adds undesirable size and cost. Also, the integrated circuitry to drive and regulate $Q_{OVP}$ is undesirable. Also, the effect of $Q_{OVP}$ on the regulation loop performance of the converter circuit 144 is undesirable. Also, regulation range limits due to $Q_{OVP}$ are undesirable.

Figure 2:
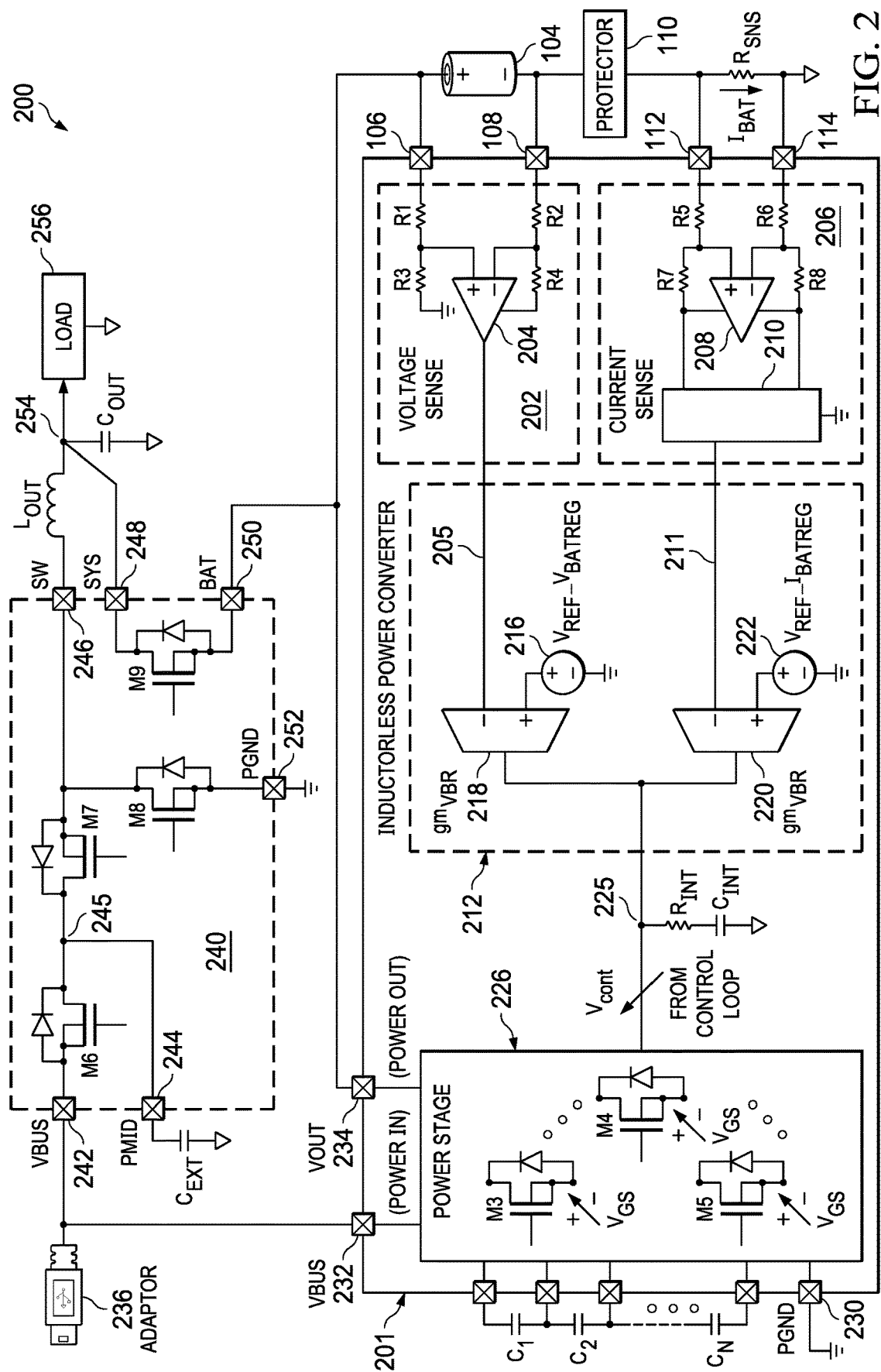
FIG. 2 is a diagram showing a system with an integrated battery charger circuit in accordance with an example embodiment.

FIG. 2 is a diagram showing a system 200 with an integrated battery charger circuit 201 in accordance with an example embodiment. In the example of FIG. 2, the integrated battery charger circuit 201 is an inductorless power converter having the BATP pin 106, the BATN pin 108, the SRP pin 112, and the SRN pin 114 mentioned in FIG. 1. In system 200, the battery 104 is coupled between the BATP pin 106 and the BATN pin 108. Also, $R_{SNS}$ is coupled between the SRP pin 112 and the SRN pin 114. Also, the protector circuit 110 is between the BATN pin 108 and the SRP pin 112. In other examples, both the protector circuit 110 and $R_{SNS}$ reside at the high side or BATP side of the battery 104.

As shown, the integrated battery charger circuit 201 includes a voltage sense circuit 202 configured to provide a battery voltage sense signal 205. In the example of FIG. 2, the voltage sense circuit 202 includes an operational amplifier 204 with inputs based on the voltage levels at the BATP terminal 106 and the BATN terminal 108, and based on the values of the resistors (R1-R4) coupled to the inputs of the operational amplifier 204. The integrated battery charger circuit 201 also includes a current sense circuit 206 configured to provide a battery current sense signal 211. In the example of FIG. 2, the current sense circuit 206 includes an operational amplifier 208 with inputs based on the current levels at the SRP terminal 112 and the SRN terminal 114, and based on the values of the resistors (R5-R8) coupled to the inputs of the operational amplifier 208. The outputs of the operational amplifier 208 are provided to circuit 210, which corresponds to a differential to single ended voltage conversion block with gain adjustment, resulting in the battery current sense signal 211.

As shown, a control circuit 212 receives the battery voltage sense signal 205 and the battery current sense signal 211. In the example of FIG. 2, the control circuit 212 includes a first transconductance stage 218 configured to compare the battery voltage sense signal 205 with a battery voltage reference value ($V_{REF\_V_{BATREG}}$) provided by a first reference source 216. The output of the first transconductance stage 218 corresponds to the output ($V_{cont}$) of the control circuit 212. When the battery voltage sense signal 205 is greater than $V_{REF\_V_{BATREG}}$, $V_{cont}$ is used to adjust conductivity of at least one of the transistors (M3-M5) of a power stage 226 of the integrated battery charger circuit 201. In some examples, the value of $V_{cont}$ is a function of the output of the first transconductance stage 218 as well as the values of an internal resistor ($R_{INT}$) and an internal capacitor ($C_{INT}$) coupled to a control terminal 225 between an output of the control circuit 212 and the power stage 226. As shown, $R_{INT}$ and $C_{INT}$ are in series between the control terminal 225 and a ground terminal.

In the example of FIG. 2, the control circuit 212 also includes a second transconductance stage 220 configured to compare the battery current sense signal 211 with a battery current reference value ($V_{REF\_I_{BATREG}}$) provided by a second reference source 222. The output of the second transconductance stage 220 corresponds to the output ($V_{cont}$) of the control circuit 212. When the battery current sense signal 211 is greater than $V_{REF\_I_{BATREG}}$, $V_{cont}$ is used to adjust conductivity of at least one of the transistors (M3-M5) of the power stage 226. In some examples, the value of $V_{cont}$ is a function of the output of the second transconductance stage 218 as well as the values of $R_{INT}$ and $C_{INT}$. Based on the value of $V_{cont}$, the conductivity of one or more of the transistors (M3-M5) of the power stage 226 is adjusted to account for an overvoltage and/or overcurrent condition.

In different examples, the topology of the power stage 226 varies. In the example of FIG. 2, the power stage 226 is coupled to a power supply (VBUS) terminal 232, various capacitors C1-CN, a ground terminal (PGND), and an output voltage (VOUT) terminal 234. Regardless of the particular topology used, $V_{cont}$ is used to adjust the gate-to-source voltage ($V_{GS}$) of at least one of the transistors of the power stage 226. In some examples, an overvoltage and/or overcurrent condition detected by the voltage sense circuit 202, the current sense circuit 206, and the control circuit 212 triggers a decrease in $V_{GS}$ of at least one of the transistors of the power stage 226. The decrease in $V_{GS}$ of a transistor reduces its conductivity, which results in VOUT at terminal 234 dropping in response to an overvoltage and/or overcurrent condition. In this manner, VOUT is maintained within a target range over time while accounting for overvoltage and/or overcurrent conditions.

In the example of FIG. 2, the system 200 also includes an adaptor 236 coupled to the VBUS terminal 232. The adaptor 236 is also coupled to a switching converter circuit 240 that includes various transistors (M6-M9). More specifically, the current terminals of M6 and M7 are in series between a VBUS terminal 242 and a switch terminal (SW) 246. Between adjacent current terminals of M6 and M7 is a control terminal 245 coupled to a PMID terminal 244, where an external capacitor ($C_{EXT}$) is coupled to the PMID terminal 244. As shown, M8 is coupled between the SW terminal 246 and a ground terminal. Also, the current terminals of M9 are coupled between a system (SYS) terminal 248 and a battery (BAT) terminal 250, where M9 is used to select when the battery 104 powers the load 256 instead of the switching converter circuit 240. As shown, the system 200 also includes an output inductor ($L_{OUT}$), and output capacitor ($C_{OUT}$), and an output terminal 254 between $L_{OUT}$ and $C_{OUT}$.

With the integrated battery charger circuit 201, an external OVP FET is unnecessary in the system 200, which reduces size and cost of the of the battery charger solution. Also, integrated circuitry to drive and regulate $Q_{OVP}$ is avoided. Also, the effect of $Q_{OVP}$ on the regulation loop performance of the integrated battery charger circuit 201 is avoided. Also, regulation range limits due to $Q_{OVP}$ are avoided for the integrated battery charger circuit 201.

Figure 3:
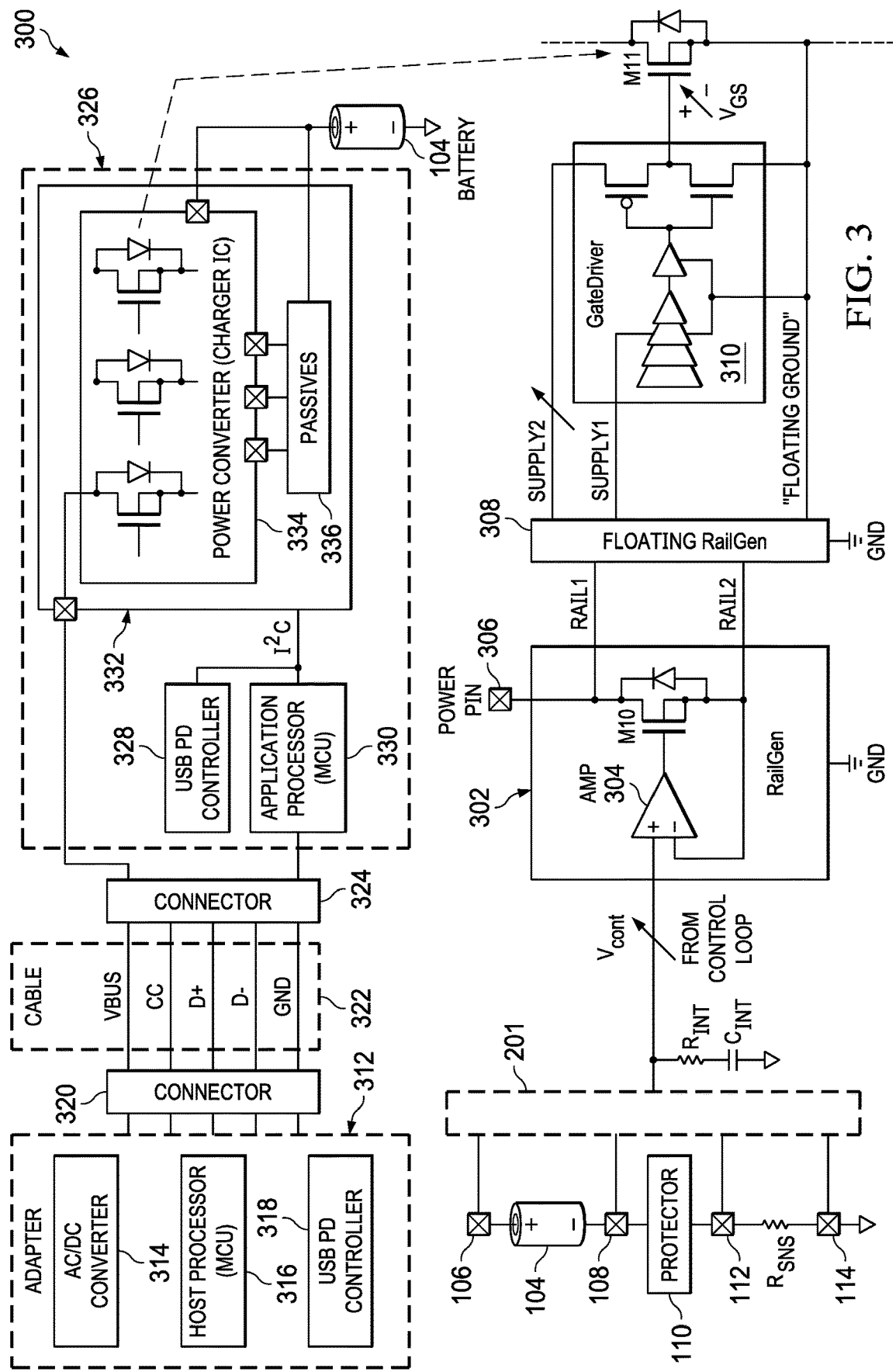
FIG. 3 is a diagram showing part of another system with the integrated battery charger circuit of FIG. 2 in accordance with an example embodiment.

FIG. 3 is a diagram showing part of another system 300 with the integrated battery charger circuit 201, the BATP pin 106, the BATN pin 108, the SRP pin 112, and the SRN pin 114 mentioned in FIG. 2 in accordance with an example embodiment. In system 300, the battery 104 is coupled between the BATP pin 106 and the BATN pin 108. Also, $R_{SNS}$ is coupled between the SRP pin 112 and the SRN pin 114. Also, the protector circuit 110 is between the BATN pin 108 and the SRP pin 112. In other examples, both the protector circuit 110 and $R_{SNS}$ reside at the high side or BATP side of the battery 104.

In the system 300, the integrated battery charger circuit 201 provides $V_{cont}$ to a rail generation circuit 302 with an operational amplifier 304, where $V_{cont}$ is input to the positive input terminal of the operational amplifier 304. Also, the negative input terminal of the operational amplifier 304 is coupled to a second current terminal of a transistor (M10) and to a floating rail generation circuit 308. Also, the first current terminal of M10 is coupled to a power pin 306, and the control terminal of M10 is coupled to the output of the operational amplifier 304. With the arrangement of the rail generation circuit 302, the floating rail generation circuit 308 receives two rail signals (Rail1 and Rail2) from the rail generation circuit 302. In operation, the floating rail generation circuit 308 is configured to provide a floating ground signal, a first supply signal (Supply1) and a second supply signal (Supply2) to a gate driver circuit 310, which is configured to provide a gate drive signal to a transistor (M11). In some examples, when $V_{cont}$ is adjusted to reduce, by the control loop, the reaction to an overvoltage or overcurrent condition, Supply2 is adjusted such that the gate drive signal provided by the gate driver circuit 310 to M11 is decreased.

In the example of FIG. 3, M11 is part of a converter circuit 332 with a power stage 334 and passive components 336 configured to charge the battery 104. In FIG. 3, the converter circuit 332 is part of a consumer electrical device 326 (e.g., a smart phone, tablet, or other device). In the example of FIG. 3, the consumer electrical device 326 also includes a USB power delivery (PD) controller circuit 328 and an application processor 330. Also, a power adaptor 312 is coupled to the consumer electrical device 326 via a first connector 320, a cable 322, and a second connector 324 (e.g., a USB cable). In some examples, the power adaptor 312 includes a AC/DC converter 314, a host processor (MCU) 316, and a USP PD controller circuit 318.

With the integrated battery charger circuit 201, an external OVP FET is unnecessary in the system 300, which reduces size and cost of the of the battery charger solution. Also, integrated circuitry to drive and regulate $Q_{OVP}$ is avoided in the system 300. Also, the effect of $Q_{OVP}$ on the regulation loop performance is avoided in the system 300. Also, regulation range limits due to $Q_{OVP}$ are avoided in the system 300.

Figure 4:
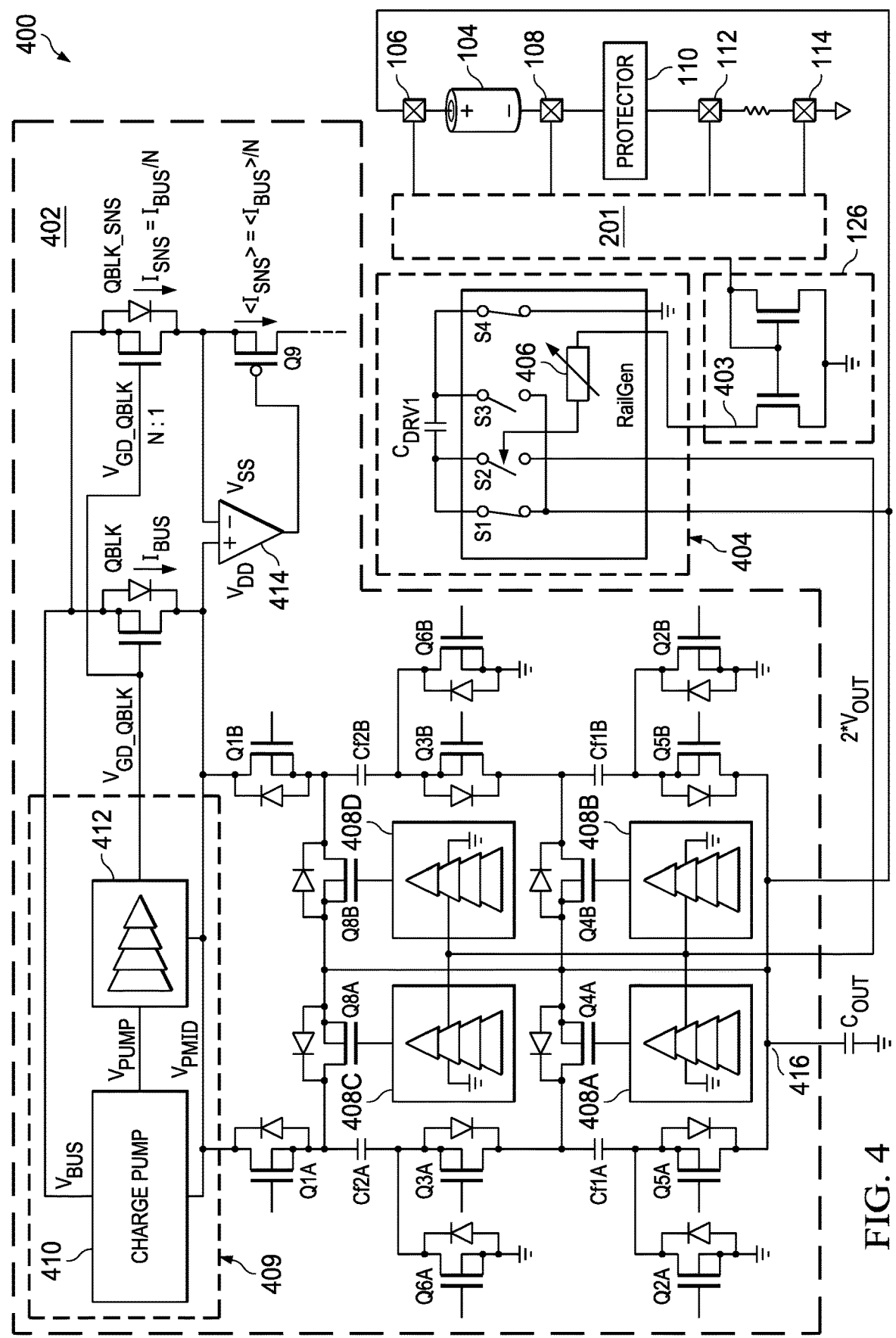
FIG. 4 is a diagram showing a battery charge scenario with the integrated battery charger circuit of FIG. 2 in accordance with an example embodiment.

FIG. 4 is a diagram showing a battery charge scenario 400 with the integrated battery charger circuit 201, the BATP pin 106, the BATN pin 108, the SRP pin 112, and the SRN pin 114 mentioned in FIG. 2 in accordance with an example embodiment. In scenario 400, the battery 104 is coupled between the BATP pin 106 and the BATN pin 108. Also, $R_{SNS}$ is coupled between the SRP pin 112 and the SRN pin 114. Also, the protector circuit 110 is between the BATN pin 108 and the SRP pin 112. In other examples, both the protector circuit 110 and $R_{SNS}$ reside at the high side or BATP side of the battery 104.

In the scenario 400, the integrated battery charger circuit 201 is coupled to the battery 104 via the BATP pin 106 and the BATN pin 108 to perform battery voltage sensing as described herein. Also, the integrated battery charger circuit 201 is coupled to $R_{SNS}$ via the SRP pin 112 and the SRN pin 114 to perform battery current sensing as described herein. The output of the integrated battery charger circuit 201 is provided to the current mirror 126, and the mirrored signal 403 is provided to a rail generation circuit 404. In the example of FIG. 4, the rail generation circuit 404 includes a rail generation controller 406 configured to adjust at least one of the switches (S1-S4) of the rail generation circuit 404 based on the mirrored signal 403. The rail generation circuit 404 also includes an integrated or external capacitor ($C_{DRV1}$), where a first (e.g., left) plate of $C_{DRV1}$ is coupled to S1 and S2, and where a second (e.g., right) plate of $C_{DRV1}$ is coupled to S3 and S4.

In the example of FIG. 4, the output (e.g., $2*V_{OUT}$) of the rail generation circuit 404 is provided to gate drive circuits 408A-408D of a power stage 402, where the gate drive circuits 408A-408D adjust the gate drive signals provided to respective transistors. More specifically, the power stage 402 in scenario 400 corresponds to a 1S tripler topology, and the output of the integrated battery charger circuit 201 is used to regulate $V_{OUT}$ to charge the battery 104 through integrated FETs in discharge communication of the flying capacitors (Cf1A, Cf1B, Cf2A, Cf2B). More specifically, the gate drive circuit 408A adjusts the gate drive signal for a first transistor (Q4A) of the power stage 402 in response to an overvoltage or overcurrent condition indicated by the output of the integrated battery charger circuit 201. Also, the gate drive circuit 408B selectively adjusts the gate drive signal for a second transistor (Q4B) of the power stage 402 in response to an overvoltage or overcurrent condition indicated by the output of the integrated battery charger circuit 201. Also, the gate drive circuit 408C selectively adjusts the gate drive signal for a third transistor (Q8A) of the power stage 402 in response to an overvoltage or overcurrent condition indicated by the output of the integrated battery charger circuit 201. Also, the gate drive circuit 408D selectively adjusts the gate drive signal for a third transistor (Q8B) of the power stage 402 in response to an overvoltage or overcurrent condition indicated by the output of the integrated battery charger circuit 201.

As shown, the power stage 402 includes various other components including various transistors (e.g., Q1A, Q1B, Q2A, Q2B, Q3A, Q3B, Q4A, Q4B, Q5A, Q5B, Q6A, Q6B, Q7A, Q7B, Q8A, and Q8B) in a 1S tripler arrangement. The power stage 402 also includes a blocking transistor (QBLK) and a related gate driver circuit 409 with a charge pump 410 and a buffer 412. The power stage 402 also includes another transistor (QBLK_SNS) to sense operation of QBLK, where an operational amplifier 414 and a transistor (Q9) are used to propagate the sense signal provided through QBLK_SNS.

With the integrated battery charger circuit 201, an external OVP FET is unnecessary in the scenario 400, which reduces size and cost of the battery charger solution. Also, integrated circuitry to drive and regulate $Q_{OVP}$ is avoided. Also, the effect of $Q_{OVP}$ on the regulation loop performance is avoided. Also, regulation range limits due to $Q_{OVP}$ are avoided.

Figure 5:
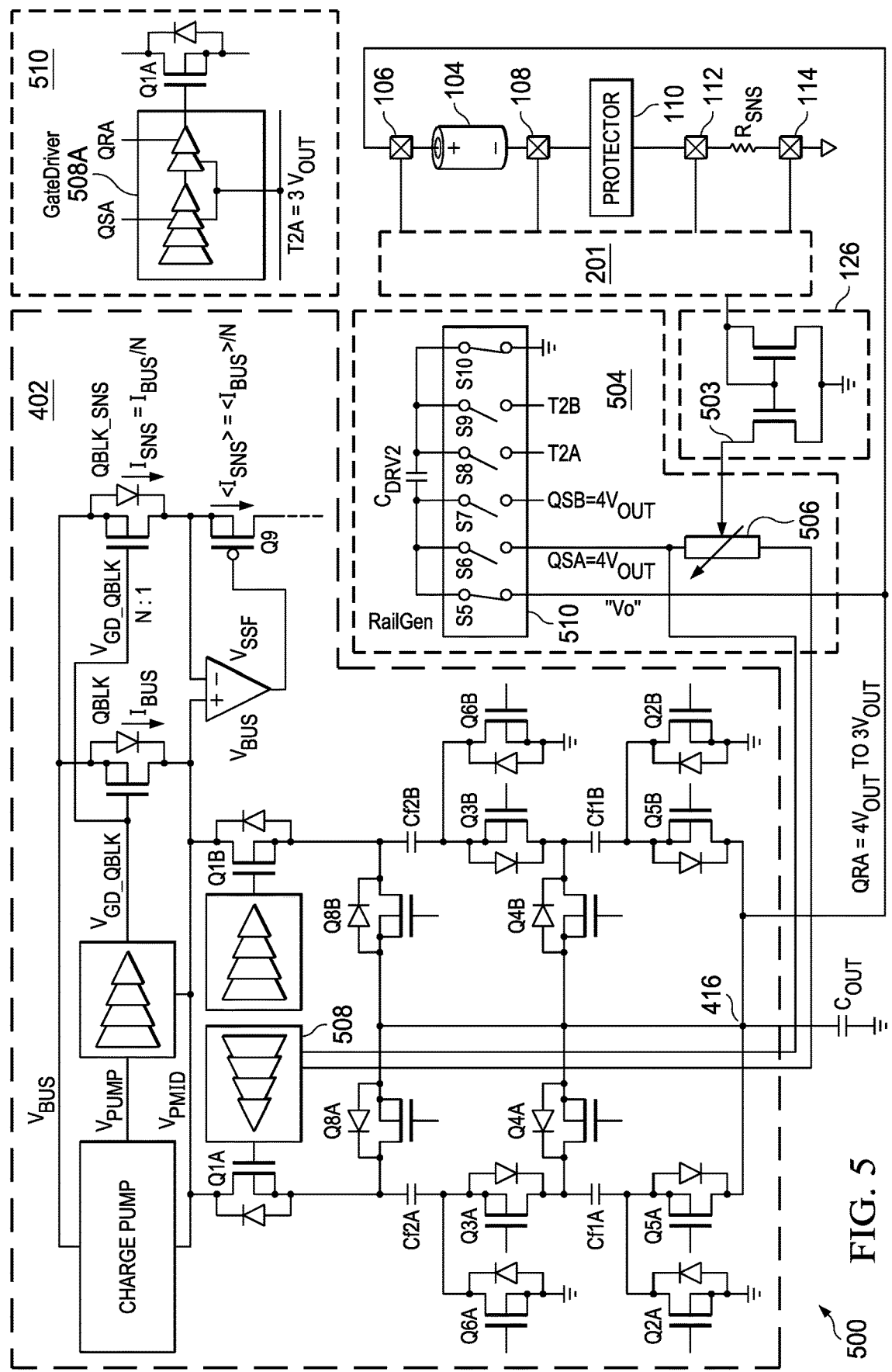
FIG. 5 is a diagram showing another battery charge scenario with the integrated battery charger circuit of FIG. 2 in accordance with an example embodiment.

FIG. 5 is a diagram showing another battery charge scenario 500 with the integrated battery charger circuit 201, the BATP pin 106, the BATN pin 108, the SRP pin 112, and the SRN pin 114 mentioned in FIG. 2 in accordance with an example embodiment. with the integrated battery charger circuit 201 of FIG. 2 in accordance with some examples. In the scenario 500, the integrated battery charger circuit 201 is coupled to the battery 104 via the BATP pin 106 and the BATN pin 108 to perform battery voltage sensing as described herein. Also, the integrated battery charger circuit 201 is coupled to $R_{SNS}$ via the SRP pin 112 and the SRN pin 114 to perform battery current sensing as described herein. In other examples, both the protector circuit 110 and $R_{SNS}$ reside at the high side or BATP side of the battery 104.

The output of the integrated battery charger circuit 201 is provided to the current mirror 126, and the mirrored signal 503 is provided to a rail generation circuit 504. In the example of FIG. 5, the rail generation circuit 504 includes a rail generation controller 506 configured to adjust at least one of the switches (S5-S10) of the rail generation circuit 504 based on the mirrored signal 503. The rail generation circuit 504 also includes an integrated or external capacitor ($C_{DRV2}$), where a first (e.g., left) plate of $C_{DRV2}$ is coupled to S5, S6, and S7, and where a second (e.g., right) plate of $C_{DRV2}$ is coupled to S8, S9, and S10.

In the example of FIG. 5, the rail generation circuit 504 provides multiple outputs including QSA, QSB, QRA, T2A, and T2B. In some examples, QSA=4*$V_{OUT}$, QSB=4*$V_{OUT}$, QRA=3*$V_{OUT}$ to 4*$V_{OUT}$, T2A=3*$V_{OUT}$, and T2B=3*$V_{OUT}$. As shown, QRA and QSA are provided to a gate driver circuit 508 of the power stage 502, where the gate drive circuit 508 adjusts the gate drive signal provided to a respective transistor (Q1A). In the scenario 500, the power stage 402 corresponds a 1S tripler topology, and the output of the integrated battery charger circuit 201 is used to regulate $V_{OUT}$ to charge the battery 104 through integrated FETs in charge communication of the flying capacitors (Cf1A, Cf1B, Cf2A, Cf2B). More specifically, the gate drive circuit 508 adjusts the gate drive signal for Q1A of the power stage 402 in response to an overvoltage or overcurrent condition indicated by the output of the integrated battery charger circuit 201. Although not shown in the figure, different portions of the rail generation circuit 504 are complementary. For example, for Q1B commutation, QSB and QRB rails (similar to the QSA and QRA rails) are used to power the gate drive circuit for Q1B.

With the integrated battery charger circuit 201, an external OVP FET is unnecessary in the scenario 500, which reduces size and cost of the of the battery charger solution. Also, integrated circuitry to drive and regulate $Q_{OVP}$ is avoided. Also, the effect of $Q_{OVP}$ on the regulation loop performance is avoided. Also, regulation range limits due to $Q_{OVP}$ are avoided.

Figure 6:
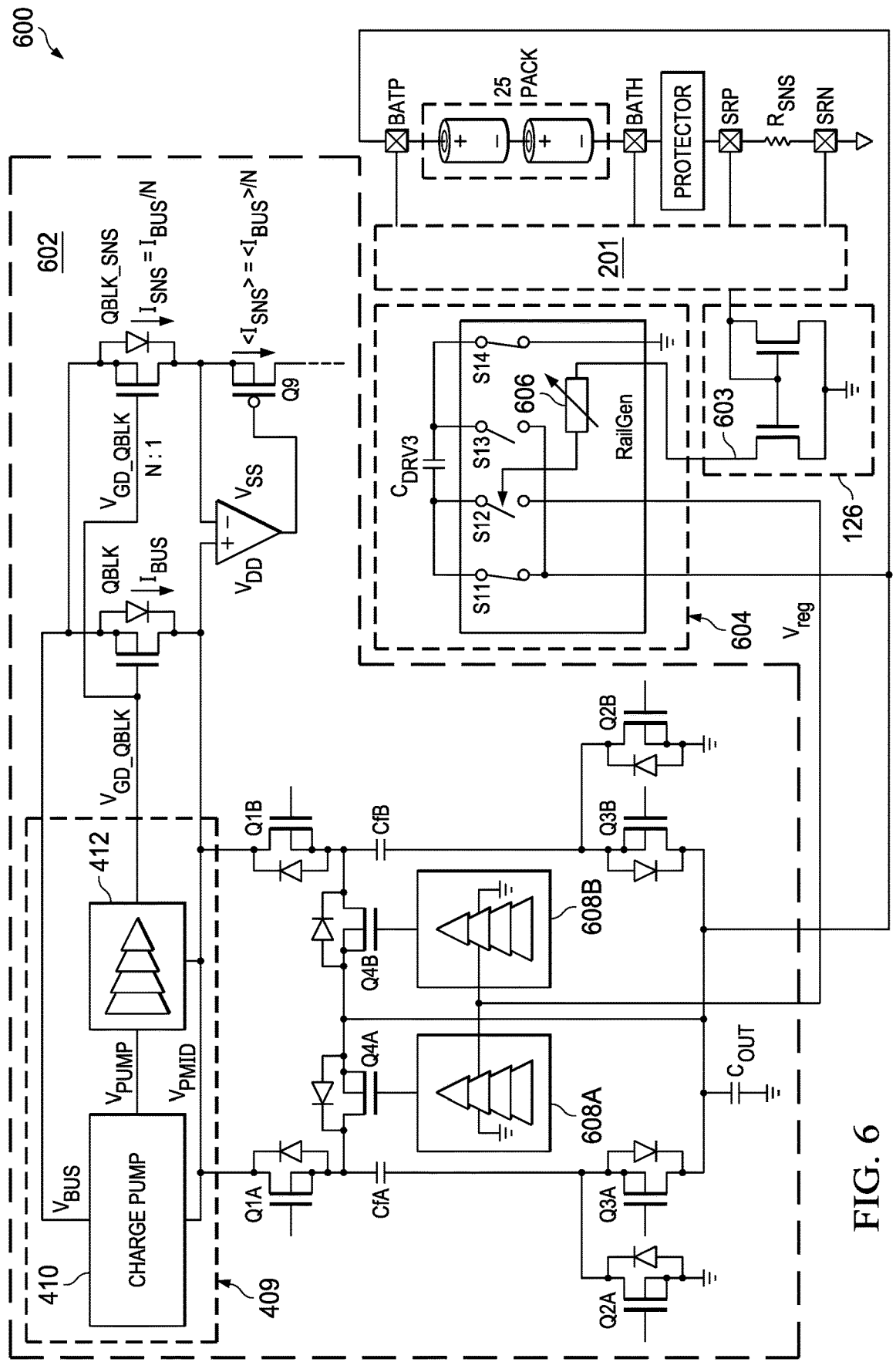
FIG. 6 is a diagram showing another battery charge scenario with the integrated battery charger circuit of FIG. 2 in accordance with an example embodiment.

FIG. 6 is a diagram showing another battery charge scenario 600 with the integrated battery charger circuit 201, the BATP pin 106, the BATN pin 108, the SRP pin 112, and the SRN pin 114 mentioned in FIG. 2 in accordance with an example embodiment. In the scenario 600, the integrated battery charger circuit 201 is coupled to the battery 104 via the BATP pin 106 and the BATN pin 108 to perform battery voltage sensing as described herein. Also, the integrated battery charger circuit 201 is coupled to $R_{SNS}$ via the SRP pin 112 and the SRN pin 114 to perform battery current sensing as described herein. In other examples, both the protector circuit 110 and $R_{SNS}$ reside at the high side or BATP side of the battery 104.

The output of the integrated battery charger circuit 201 is provided to the current mirror 126, and the mirrored signal 603 is provided to a rail generation circuit 604. In the example of FIG. 6, the rail generation circuit 604 includes a rail generation controller 606 configured to adjust at least one of the switches (S11-S14) of the rail generation circuit 604 based on the mirrored signal 603. The rail generation circuit 604 also includes a capacitor ($C_{DRV3}$), where a first (e.g., left) plate of $C_{DRV3}$ is coupled to S11 and S12, and where a second (e.g., right) plate of $C_{DRV3}$ is coupled to S13 and S14.

In the example of FIG. 6, the output ($V_{reg}$) of the rail generation circuit 604 is provided to gate drive circuits 608A-408B of a power stage 602, where the gate drive circuits 608A-608B adjust the gate drive signals provided to respective transistors. More specifically, the power stage 602 in scenario 600 corresponds to a 2S doubler topology, and the output of the integrated battery charger circuit 201 is used to regulate $V_{OUT}$ to charge the battery 104 through integrated FETs in discharge communication of the flying capacitors (CfA, CfB). More specifically, the gate drive circuit 608A adjusts the gate drive signal for a first transistor (Q4A) of the power stage 602 in response to an overvoltage or overcurrent condition indicated by the output of the integrated battery charger circuit 201. Also, the gate drive circuit 608B selectively adjusts the gate drive signal for a second transistor (Q4B) of the power stage 602 in response to an overvoltage or overcurrent condition indicated by the output of the integrated battery charger circuit 201

As shown, the power stage 602 includes various other components including various transistors (e.g., Q1A, Q1B, Q2A, Q2B, Q3A, Q3B, Q4A, and Q4B) in a 2S doubler arrangement. The power stage 402 also includes QBLK and the gate driver circuit 409 described in FIG. 4. The power stage 602 also includes QBLK_SNS, the operational amplifier 414, and Q9 described in FIG. 4.

With the integrated battery charger circuit 201, an external OVP FET is unnecessary in the scenario 600, which reduces size and cost of the of the battery charger solution. Also, integrated circuitry to drive and regulate $Q_{OVP}$ is avoided. Also, the effect of $Q_{OVP}$ on the regulation loop performance is avoided. Also, regulation range limits due to $Q_{OVP}$ are avoided.

Figure 7:
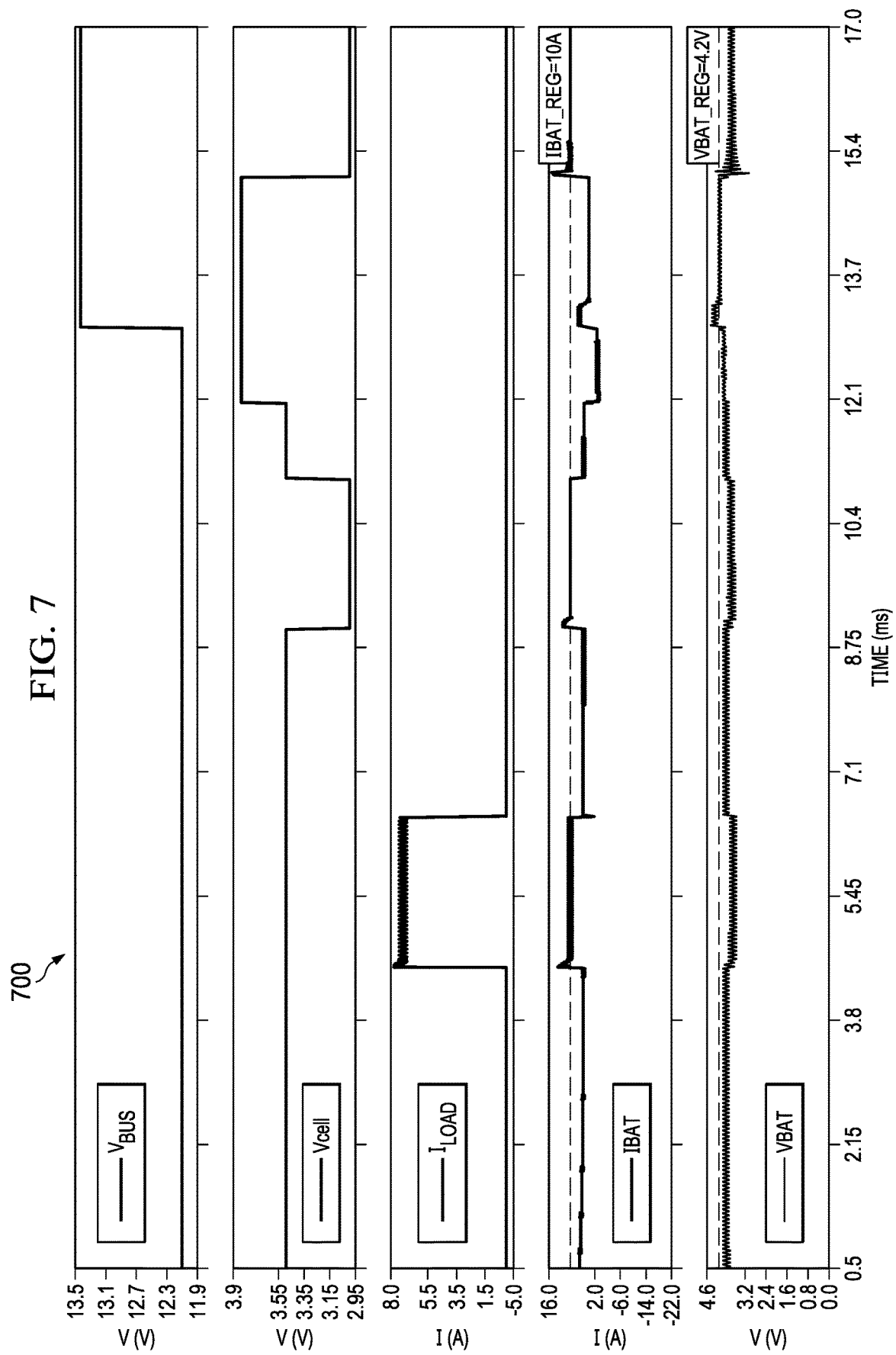
FIG. 7 is a graph showing various waveforms related to integrated battery charger circuits in accordance with an example embodiment.

FIG. 7 is a graph 700 showing various waveforms related to integrated battery charger circuits in accordance with an example embodiment. In the graph 700, waveforms for VBUS, Vcell, $I_{LOAD}$, IBAT, and VBAT are represented to show regulation through integrated FETs in charge commutation of the flying capacitors for a 1S tripler topology (e.g., the power stage 402 in FIG. 4). In some examples, Vcell corresponds to a cell voltage or battery voltage. The moment the current going into the battery exceeds the IBAT_REG level, the described regulation loop takes over and regulates the deliverable current to the battery at the IBAT_REG level. If the current being delivered to the battery is less than IBAT_REG, there is no regulation (no VGS adjustment on any FETs) and thus the power stage is operating at full swing without any conductivity adjustments. Similarly, the moment the voltage going into the battery exceeds the VBAT_REG level, the described regulation loop takes over and regulates the voltage to the battery at the VBAT_REG level. If the voltage being delivered to the battery is less than VBAT_REG, there is no regulation (no VGS adjustment on any FETs) and thus the power stage is operating at full swing without any conductivity adjustments. As used herein, 1S refers to a 1 cell series configuration. For an Li-Ion battery scenario, 1S would correspond to a ~4.2V cell.

Figure 8:
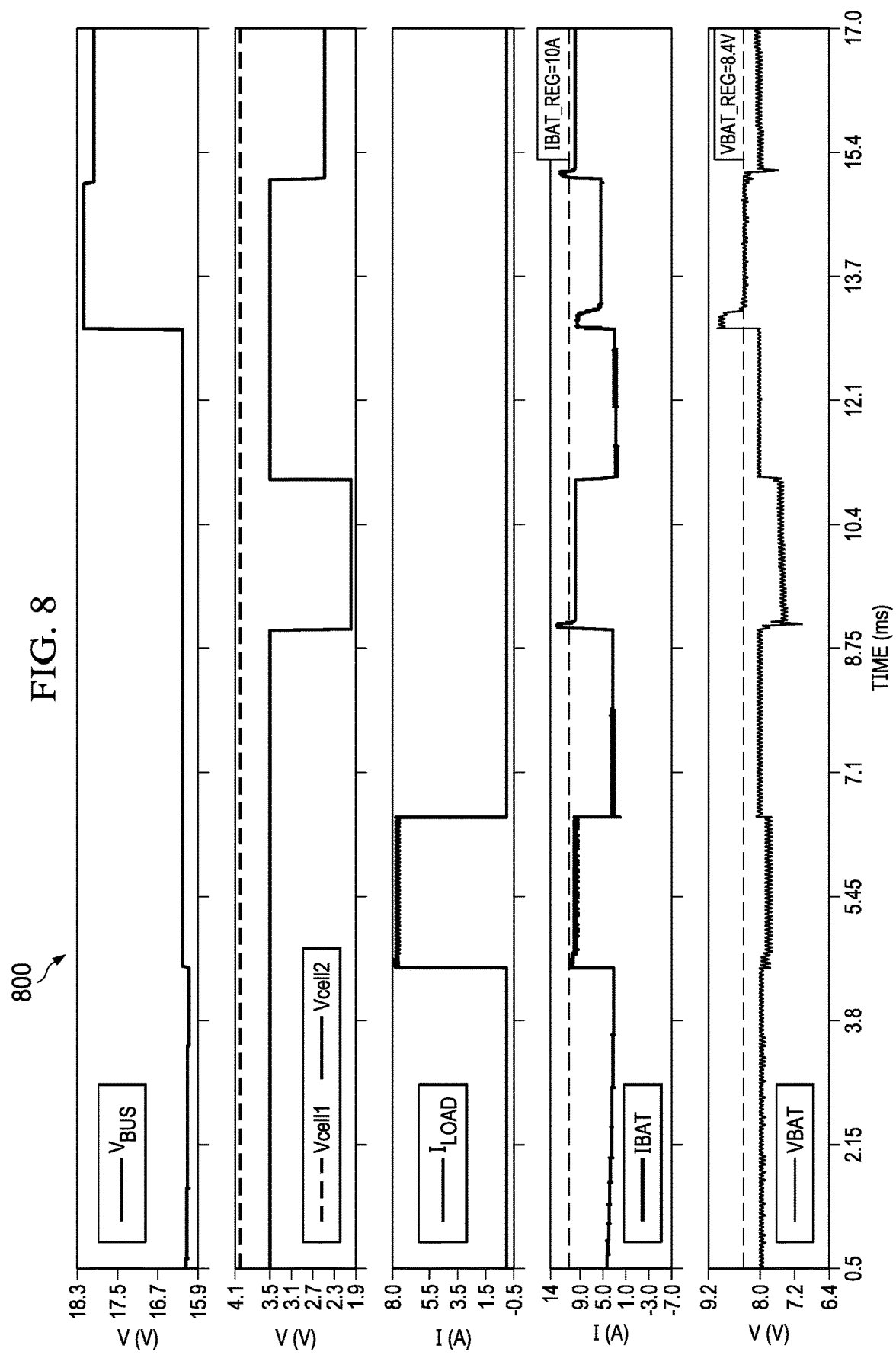
FIG. 8 is a graph showing various waveforms related to integrated battery charger circuits in accordance with an example embodiment

FIG. 8 is a graph 800 showing various waveforms related to integrated battery charger circuits in accordance with an example embodiment. In the graph 800, waveforms for VBUS, Vcell1, Vcell2, $I_{LOAD}$, IBAT, and VBAT are represented to show regulation through integrated FETs in charge commutation of the flying capacitors for a 2S doubler topology (e.g., the power stage 602 in FIG. 6). In a 2S configuration, there are 2 battery cells connected in series. In the graph 800, Vcell1 is the voltage observed across the $1^{st}$ battery cell, and Vcell2 is the voltage across the $2^{nd}$ battery cell. The moment the current going into the battery (IBAT) exceeds the IBAT_REG level, the described regulation loop takes over and regulates the deliverable current to the battery at the IBAT_REG level. If IBAT is less than IBAT_REG, there is no regulation (no VGS adjustment on any FETs) and thus the power stage is operating at full swing without any conductivity adjustments. Similarly, the moment the voltage going into the battery (VBAT) exceeds the VBAT_REG level, the described regulation loop takes over and regulates the voltage to the battery at the VBAT_REG level. If VBAT is less than VBAT_REG, there is no regulation (no VGS adjustment on any FETs) and thus the power stage is operating at full swing without any conductivity adjustments. As used herein, 2S refers to a 2 cell series configuration. For an Li-Ion battery scenario, 2S would correspond to ~2×4.2V or a ~8.4V pack.

In some examples, a system includes a switching converter circuit (e.g., the switching converter circuit 240 in FIG. 2) adapted to be coupled between an input voltage source (e.g., adapter 236 in FIG. 2) and a load (e.g., the load 256 in FIG. 2); and an integrated circuit (e.g., the integrated battery charger circuit 201 in FIG. 2) adapted to be coupled between the input voltage source and a battery (e.g., the battery 104 in FIG. 2) and configured to charge the battery. The integrated circuit has: monitoring circuitry (e.g., the voltage sense circuit 202 and the current sense circuit 206 in FIG. 2) adapted to be coupled to the battery and configured to detect a transient fault condition of the integrated circuit; a power stage (e.g., power stage 226 in FIG. 2, power stage 334 in FIG. 3, power stage 402 in FIGS. 4 and 5, or power stage 602 in FIG. 6) adapted to be coupled between the input voltage source and the battery, the power stage having a power switch (e.g., M3-M5 in FIG. 2, M11 in FIG. 3, Q4A, Q4B, Q8A, Q8B in FIG. 4, Q1A in FIG. 5, Q4A and Q4B in FIG. 6); and a control circuit (e.g., the control circuit 212 in FIG. 2) coupled between the monitoring circuitry and the power stage, the control circuit configured to provide a control signal (e.g., $V_{cont}$ in FIGS. 2 and 3) to adjust a conductivity of the power switch responsive to a detected transient fault condition (e.g., an overcurrent or undercurrent condition) of the IC (battery charger circuitry).

In some example embodiments, the monitoring circuit comprises a voltage sense circuit (e.g., the voltage sense circuit 202 in FIG. 2) configured to provide a battery voltage sense signal (e.g., signal 205 in FIG. 2) The control circuit comprises a transconductance stage (e.g., the first transconductance stage 218 in FIG. 2) configured to compare the battery voltage sense signal to a voltage reference value (e.g., $V_{REF\_VBATREG}$ in FIG. 2) Also, an output of the transconductance stage is coupled to a gate driver circuit (e.g., the gate driver circuit 408A-408D in FIG. 4, the gate driver circuit 508 in FIG. 5, the gate driver circuit 608A and 608B in FIG. 6) for the power switch.

In some example embodiments, the monitoring circuitry further comprises a current sense circuit (e.g., the current sense circuit 206 in FIG. 2) configured to provide a battery current sense signal (e.g., signal 211 in FIG. 2). The transconductance stage is a first transconductance stage (e.g., the first transconductance stage 218 in FIG. 2). The control circuit comprises a second transconductance stage (e.g., the second transconductance stage 220 in FIG. 2) configured to compare the battery current sense signal to a battery reference value (e.g., $V_{REF\_IBATREG}$ in FIG. 2), and an output of the second transconductance stage is coupled to a gate driver circuit (e.g., the gate driver circuit 408A-408D in FIG. 4, the gate driver circuit 508 in FIG. 5, the gate driver circuit 608A and 608B in FIG. 6) for the power switch. In some example embodiments, the voltage reference value and the current reference value are based on target battery charge limits.

In some example embodiments, the control circuit includes a control terminal (e.g., the control terminal 225 in FIG. 2) coupled to outputs of the first and second transconductance stages. The control circuit also includes a resistor (e.g., $R_{INT}$ in FIG. 2) and a capacitor (e.g., $C_{INT}$ in FIG. 2) in series between the control terminal and a ground terminal. In some examples, the control circuit includes a first diode (e.g., D1 in FIG. 2) with an anode coupled to an output of the first transconductance stage and with a cathode coupled to the control terminal. In some example embodiments, the control circuit includes a second diode (e.g., D2 in FIG. 2)

with an anode coupled to an output of the second transconductance stage and with a cathode coupled to the control terminal.

In some example embodiments, the power stage has a 1S tripler topology (e.g., the power stage 402 in FIGS. 4 and 5) that includes the power switch and at least one additional power switch. The control circuit is configured to provide control signals to adjust a conductivity of the power switch and the at least one additional power switch in response to a transient fault condition of the IC. In some examples, the power stage has a 2S doubler topology (e.g., the power stage 602) that includes the power switch and at least one additional power switch. The control circuit is configured to provide control signals to adjust a conductivity of the power switch and the at least one additional power switch in response to a transient fault condition of the IC. In some examples, the control circuit is configured to provide the control signal (e.g., $V_{Cont}$ in FIGS. 2 and 3) to decrease a conductivity of at least the power switch during a flying capacitor charge commutation in response to an overvoltage or overcurrent transient fault condition of the IC. In some examples, the control circuit is configured to provide the control signal to decrease a conductivity of at least the power switch during a flying capacitor discharge commutation in response to an overvoltage or overcurrent transient fault condition of the IC. In some examples, the load (e.g., the load 256 in FIG. 2) is a USB power delivery adaptor.

In some example embodiments, a battery charger integrated circuit (e.g., the integrated battery charger circuit 201 in FIG. 2) includes: a first battery terminal (e.g., the BATP pin 106 in FIG. 2); a second battery terminal (e.g., the BATN pin 108 in FIG. 2); a control circuit (e.g., the control circuit 212 in FIG. 2) having a first input (e.g., the input to receive the battery voltage sense signal 205 in FIG. 2) and a second input (e.g., the input to receive the battery current sense signal 211 in FIG. 2); a voltage sense circuit (e.g., the voltage sense circuit 202 in FIG. 2) having first voltage sense input (e.g., the input coupled to the BATP pin 106 in FIG. 2), a second voltage sense input (e.g., the input coupled to the BATN pin 108 in FIG. 2), and a voltage sense output (e.g., the output of the operational amplifier 204 in FIG. 2), the first voltage sense input coupled to the positive battery terminal, the second voltage sense input coupled to the negative battery terminal, and the voltage sense output coupled to the first input of the control circuit; a current sense circuit (e.g., the current sense circuit 206 in FIG. 2) having a first current sense input (e.g., coupled to SRP pin 112 in FIG. 2), a second current sense input (e.g., coupled to the SRN pin 114 in FIG. 2), and a current sense output (e.g., to provide the battery current sense signal 211 in FIG. 2), the first current sense input coupled to a first side of a sense resistor (e.g., $R_{SNS}$ in FIG. 2) in series with the positive battery terminal and the negative battery terminal, the second current sense input coupled to a second side of the sense resistor, and the current sense output coupled to the second input of the control circuit; and a power stage (e.g., power stage 226 in FIG. 2, power stage 334 in FIG. 3, power stage 402 in FIGS. 4 and 5, or power stage 602 in FIG. 6) with a power switch (e.g., M3-M5 in FIG. 2, M11 in FIG. 3, Q4A, Q4B, Q8A, Q8B in FIG. 4, Q1A in FIG. 5, Q4A and Q4B in FIG. 6) and a gate driver circuit (e.g., gate driver circuits 408A-408D in FIG. 4, gate driver circuit 508 in FIG. 5, and gate driver circuits 608A and 608B in FIG. 6) for the power switch, the gate driver circuit coupled to an output of the control circuit.

In some example embodiments, the control circuit includes a first transconductance stage (e.g., the first transconductance stage 218 in FIG. 2) coupled to an output of the voltage sense circuit. The control circuit also includes a second transconductance stage (e.g., the second transconductance stage 220 in FIG. 2) coupled to an output of the current sense circuit. In some examples, the control circuit also includes a control terminal (e.g., the control terminal 225 in FIG. 2) at the outputs of the first and second transconductance stages. In some example embodiments, the control circuit also includes a resistor (e.g., $R_{INT}$ in FIG. 2) and a capacitor (e.g., $C_{INT}$ in FIG. 2) in series between the control terminal and a ground terminal.

Compared to other battery charge solutions, the solutions are advantageous because an external OVP FET is unnecessary. Such OVP FETs can be as large as the battery charge IC. By eliminating the external OVP FET, there is a cost and size savings for the battery charge solution. Also, the effect of external OVP FET parameters to the regulation loop is eliminated. Thus, regulation loop optimization for just for one external OVP FET is avoided (different external FETs might cause non-optimal regulation loop response).

The battery charge solutions are applicable to any switched capacitor topology with any divider/multiplier ratio. The battery charge solutions are equally applicable to single cell as well as to multi cell systems. The battery charge solutions provide flexibility to configure the overdrive regulation on mission critical switches without limiting the regulation range. Also, because there is no thermal sense and protection on an external OVP FET, the regulation voltage range across the FET has a pre-set limit. Also, integrated regulation eliminates this concern, and a larger range of regulation is possible. Also, it is possible to select the switch(es) for regulation so that the body diode(s) of the switch(es) don't limit the regulation range. Also, because each controlled (regulated) impedance is on-chip, all relevant parasitics which might be important to the control loop and thermals of the overall solution are in check due to integrated integration. The battery charge solutions enable an optimal regulation loop response to be achieved because there is no external dependence.

In some example embodiments, the battery charge solutions: 1) eliminate external OVP FET from the system solution and regulate the battery voltage and battery current (which might have fluctuations during wall adapter and system transients) elsewhere to secure protection of the battery; 2) monitor the battery voltage & battery current and compare them against their desired regulation targets; 3) use the error signal in 2) for regulation; 4) regulate the gate overdrive of integrated power switches; 5) if the monitored quantities are below their regulation targets, provide full gate overdrive to the integrated power switches; 6) if either one of the monitored quantities exceed their regulation targets, limit the gate overdrive signal to bring the monitored quantities to target. In different example embodiments, the regulated gate overdrive could be: 1) for the switches used during flying capacitor charge commutation; or 2) for the switches used during flying capacitor discharge commutation. In some examples, the regulation loop is built around already existing integrated power switches by controlling their gate overdrive.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

Modifications are possible in the described embodiments, and other embodiments are possible, within the scope of the claims.

What is claimed is:

1. A system, comprising:
 a switching converter circuit adapted to be coupled between an input voltage source and a load; and
 an integrated circuit adapted to be coupled between the input voltage source and a battery and configured to charge the battery, the integrated circuit having:
  monitoring circuitry adapted to be coupled to the battery and configured to detect a transient fault condition of the integrated circuit;
  a power stage adapted to be coupled between the input voltage source and the battery, the power stage having a power switch;
  a control circuit coupled between the monitoring circuitry and the power stage, the control circuit including:
   a first and second transconductance stage having respective outputs coupled to a control terminal; and
   a resistor coupled in series with a capacitor between the control terminal and a ground terminal;
   wherein:
    the control circuit is configured to provide a control signal on the control terminal to adjust a conductivity of the power switch responsive to a detected transient fault condition; and
    the control signal is a function of the resistor, the capacitor, and the respective outputs of the first and second transconductance stages.

2. The system of claim 1, wherein:
 the monitoring circuitry includes a voltage sense circuit configured to provide a battery voltage sense signal;
 the first transconductance stage is configured to compare the battery voltage sense signal to a voltage reference value; and
 the output of the first transconductance stage is coupled to a gate driver circuit for the power switch.

3. The system of claim 2, wherein:
 the monitoring circuitry includes a current sense circuit configured to provide a battery current sense signal;
 the second transconductance stage is configured to compare the battery current sense signal to a current reference value; and
 the output of the second transconductance stage is coupled to the gate driver circuit for the power switch.

4. The system of claim 3, wherein the voltage reference value and the current reference value are based on target battery charge limits.

5. The system of claim 1, wherein the power stage has a 1S tripler topology that includes the power switch and at least one additional power switch, and the control circuit is configured to provide a control signal to adjust a conductivity of the power switch and the at least one additional power switch responsive to a detected transient fault condition.

6. The system of claim 1, wherein the power stage has a 2S doubler topology that includes the power switch and at least one additional power switch, and the control circuit is configured to provide a control signal to adjust a conductivity of the power switch and the at least one additional power switch responsive to a detected transient fault condition.

7. The system of claim 1, wherein the control circuit is configured to decrease a conductivity of at least the power switch during a flying capacitor charge commutation responsive to a detected overvoltage or overcurrent transient fault condition.

8. The system of claim 1, wherein the control circuit is configured to decrease a conductivity of at least the power switch during a flying capacitor discharge commutation responsive to a detected overvoltage or overcurrent transient fault condition.

9. The system of claim 1, wherein the load is a USB power delivery adaptor.

10. An integrated circuit, comprising:
 an input voltage terminal;
 a battery terminal;
 monitoring circuitry coupled to the battery terminal and configured to detect a transient fault condition of a battery charge operation of the integrated circuit;
 a power stage coupled between the input voltage terminal and the battery terminal, the power stage having a power switch; and
 a control circuit coupled between the monitoring circuitry and the power stage, the control circuit including:
  a first and second transconductance stage having respective outputs coupled to a control terminal; and
  a resistor coupled in series with a capacitor between the control terminal and a ground terminal;
  wherein:
   the control circuit configured to provide a control signal on the control terminal to adjust a conductivity of the power switch responsive to a detected transient fault condition; and
   the control signal is a function of the resistor, the capacitor, and the respective outputs of the first and second transconductance stages.

11. The integrated circuit of claim 10, wherein:
 the battery terminal is a positive battery terminal;
 the monitoring circuitry includes a voltage sense circuit coupled to the positive battery terminal and a negative battery terminal;
 the first transconductance stage is configured to compare a battery voltage sense signal from the voltage sense circuit with a voltage reference value; and
 the output of the first transconductance stage is coupled to a gate driver circuit for the power switch.

12. The integrated circuit of claim 11, wherein:
 the monitoring circuitry includes a current sense circuit coupled across a sense resistor in series with the positive battery terminal and the negative battery terminal;
 the second transconductance stage is configured to compare a battery current sense signal from the current sense circuit to a battery reference value; and
 the output of the second transconductance stage is coupled to the gate driver circuit for the power switch.

13. The integrated circuit of claim 10, further comprising a switching converter between the input voltage terminal and a load terminal.

14. The integrated circuit of claim 12, wherein the control circuit is configured to provide the control signal to decrease a conductivity the power switch during a flying capacitor charge or discharge commutation responsive to a detected overcurrent or overvoltage transient fault condition.

15. A battery charger integrated circuit, comprising:
a first battery terminal;
a second battery terminal;
a control circuit having a first input and a second input, a first and second transconductance stage with respective outputs coupled to a control terminal;
a resistor and a capacitor coupled in series between the control terminal and a ground terminal;
a voltage sense circuit having first voltage sense input, a second voltage sense input, and a voltage sense output, the first voltage sense input coupled to the first battery terminal, the second voltage sense input coupled to the second battery terminal, and the voltage sense output coupled to the first input of the control circuit;
a current sense circuit having a first current sense input, a second current sense input, and a current sense output, the first current sense input coupled to a first side of a sense resistor in series with the first battery terminal and the second battery terminal, the second current sense input coupled to a second side of the sense resistor, and the current sense output coupled to the second input of the control circuit; and
a power stage with a power switch and a gate driver circuit for the power switch, the gate driver circuit coupled to an output of the control circuit,
wherein the output of the control circuit is a function of the resistor, the capacitor, and the respective outputs of the first and second transconductance stages.

16. The battery charger integrated circuit of claim 15, wherein the control circuit includes:

the first transconductance stage is coupled to an output of the voltage sense circuit; and the second transconductance stage is coupled to an output of the current sense circuit.

17. The battery charge integrated circuit of claim 15, wherein the power stage has a 1S tripler topology that includes the power switch and at least one additional power switch, and the control circuit is configured to provide control signals to adjust a conductivity of the power switch and the at least one additional power switch responsive to a transient fault condition of the battery charger integrated circuit detected by the voltage sense circuit or current sense circuit.

18. The battery charge integrated circuit of claim 15, wherein the power stage has a 2S doubler topology that includes the power switch and at least one additional power switch, and the control circuit is configured to provide control signals to adjust a conductivity of the power switch and the at least one additional power switch responsive to a transient fault condition of the battery charger integrated circuit detected by the voltage sense circuit or the current sense circuit.

* * * * *